United States Patent [19]

Nishina

[11] Patent Number: 4,505,042

[45] Date of Patent: Mar. 19, 1985

[54] DIMENSION MEASURING INSTRUMENT

[75] Inventor: Shingo Nishina, Kawasaki, Japan

[73] Assignee: Mitutoyo Manufacturing Co., Ltd., Tokyo, Japan

[21] Appl. No.: 598,080

[22] Filed: Apr. 9, 1984

[30] Foreign Application Priority Data

Apr. 19, 1983 [JP] Japan .................................. 58-68988

[51] Int. Cl.³ .................................................. G01B 3/22
[52] U.S. Cl. .................................. 33/172 E; 33/174 L
[58] Field of Search ............. 33/172 E, 169 R, 174 L

[56] References Cited

U.S. PATENT DOCUMENTS

| 3,471,934 | 10/1969 | Miller et al. | 33/172 E |
| 3,482,323 | 12/1969 | Hamel et al. | 33/172 E |
| 3,768,169 | 10/1973 | Ito | 33/172 E |
| 4,289,382 | 9/1981 | Clark | 33/172 E |

FOREIGN PATENT DOCUMENTS

| 0092915 | 3/1983 | European Pat. Off. . |
| 387502 | 2/1931 | United Kingdom . |
| 586970 | 7/1943 | United Kingdom . |
| 775472 | 12/1953 | United Kingdom . |
| 1081786 | 5/1965 | United Kingdom . |
| 1485923 | 3/1976 | United Kingdom . |
| 1598498 | 5/1978 | United Kingdom . |
| 2012631 | 9/1978 | United Kingdom . |
| 2027891 | 6/1979 | United Kingdom . |
| 2027892 | 6/1979 | United Kingdom . |

Primary Examiner—Willis Little
Attorney, Agent, or Firm—Parkhurst & Oliff

[57] ABSTRACT

This invention concerns a dimension measuring instrument comprising an encoder for converting a displacement of a spindle into an electric signal and an analogue indication device for electrically indicating a measured value, which has been obtained through processing of an output from the encoder, by a pattern including a scale or scales, a pointer and the like. The analogue indication device is provided with a scale indicating circuit for continuously indicating two or more scales different in scale interval from each other and a pointer indicating circuit for driving the pointer in accordance with the measured value and depending on the scale interval for the indication, and a range of dimension indication is expanded without deteriorating the reading accuracy within a predetermined range of dimension indication.

9 Claims, 3 Drawing Figures

DIMENSION MEASURING INSTRUMENT

BACKGROUND OF THE INVENTION

1. Field of the Invention

This invention relates to dimension measuring instruments, and more particularly to improvements in a dimension measuring instrument suitable for use in a limit gauge such as a test indicator, comprising an encoder for converting a displacement of a spindle into an electric signal and an analogue indication device for electrically indicating a measured value, which has been obtained through processing of an output from the encoder, by a pattern including a scale or scales, a pointer and the like.

2. Description of the Prior Art

There has heretofore been known a limit gauge such as a test indicator for detecting whether or not a dimension of a workpiece to be measured remains within allowable limits, e.g. a tolerance from a displacement in the measuring direction of a spindle when the tip end of the spindle is brought into contact with the workpiece to be measured.

As the limit gauges of the type described, there have been known a so-called mechanical limit gauge wherein a plurality of pairs of stationary contact points adjustable in their positions by use of adjusting screws and the like and movable contact points movable in operational association with a spindle or a pointer of a dial gauge are assembled into the dial gauge and whether or not the dimension of the workpiece is within the allowable limits is detected from the presence or absence of electric contact between the respective contact points, and a so-called electric limit gauge wherein a position of the spindle is caught as an electric signal, an indicated value of a measured value at a reference dimension can be set at zero, whether or not the dimension of the workpiece is within the tolerance is detected from a deviation from the reference dimension.

However, in the former mechanical limit gauge, the measured value is mechanically analogue-indicated by the pointer, whereby, although the sensible quantity of the measured value and the progress of approaching the critical value or the like have been intuitively sensed, high skill level has been needed for accurately reading the measured value. Furthermore, a scale plate cannot be easily changed, and it has been difficult to change a range of measuring. Further, since the pointer has been adapted to move in mechanical association with a displacement of the spindle, such drawbacks have been presented that when the dimension of the workpiece to be measured has been unusually large, or when an impact or the like is applied to the spindle, the pointer has made a scaleover so that a measured value cannot be read, or the analogue indication device has come to be out of order.

On the other hand, in the latter electric limit gauge, a numerical value as the result of measurement is electrically and digitally indicated, whereby, although the reading of the measured value has been facilitated to a considerable extent, such a disadvantage has been presented that the sensible quantity of the measured value or the progress of approaching the critical value cannot be intuitively sensed.

To obviate the above-described disadvantage of the electric limit gauge, the present applicant has proposed in Japanese Patent Laid-Open No. 19503/83 a dimension measuring instrument for measuring a length and the like of a workpiece to be measured from a displacement of a spindle when the tip end of the spindle is brought into contact with the workpiece, wherein there is provided an encoder for converting the displacement of the spindle into an electric signal, a signal processing circuit for processing an output from the encoder to obtain a signal suitable for the indication, a digital indication device for electrically indicating a numerical value and an analogue indication device for electrically indicating a pattern including a scale within a measuring range, a pointer and the like, and a measured value such as a length or the like of the workpiece to be measured, numerical values of the scale within the measuring range, a critical value or setting data as being set values, a result of determination as to whether the measured value passes or fails the critical value, the maximum or minimum value of the measured value or measured data as being an error to the set value are indicated by the digital indication device and the analogue indication device at the same time.

The dimension measuring instrument of the type described has such characteristic features that the measured value can be easily read, the sensible quantity of the measured value or the progress of approaching the critical value can be intuitively sensed, and further, the setting data and the measured data can be indicated at the same time.

However, in the conventional electric analogue indication device, since the analogue indication has been performed at a uniform scale interval similarly to the digital indication device, if the range of indicated dimension is expanded, such disadvantages have been presented that the scale interval is enlarged and the scale spacing is decreased, whereby it becomes difficult to read. Whereas, if the scale interval is decreased so as to make reading easy, then the range of dimension indication becomes narrow, whereby the scaleovers occur frequently.

In contrast thereto, in the practical measurement, on one hand, it is necessary to read the dimension within the tolerance with high accuracy, on the other hand, an operator observes the indication of the scaleover through the dimension out of the tolerance and moreover desires to learn a quantitative rough estimate of the dimension therethrough in many cases. Particularly, in the case where the results of measurement are caught as a group, the standard deviation, the process capability and the like are sought and the quality control is effected, and further, when a production machine is regulated on the basis of these data, the quantitative rough estimate is needed for predicting the tendency. More specifically, necessity has been voiced for learning a variation in the dimension of the workpiece to be measured assuming a normal distribution-like distribution over the total area. However, it has been difficult to satisfy such a necessity with the conventional analogue indication device in which the scale interval is made uniform.

SUMMARY OF THE INVENTION

The present invention has been developed to obviate the above-described disadvantages of the prior art and has as its first object the provision of a dimension measuring instrument capable of expanding the total range of dimension indication without deteriorating the reading accuracy within a predetermined range of dimension indication, for which high reading accuracy is required.

The present invention has as its second object the provision of a dimension measuring instrument capable of readily changing the predetermined range of dimension indication.

The present invention has as its third object the provision of a dimension measuring instrument in which the minumum set scale interval is adapted within the range of zero plus or minus the tolerance values, and the scale interval is enlarged out of the range of the zero plus or minus the tolerance values, so that the range of dimension indication can be expanded.

The present invention has as its fourth object the provision of a dimension measuring instrument in which the reading accuracy is gradually reduced out of the range of the predetermined dimension indication.

The present invention has as its fifth object the provision of a dimension measuring instrument having an indication scale pattern in which the scale is easily provided.

The present invention has as its sixth object the provision of a dimension measuring instrument capable of easily changing the scale pattern.

The present invention has as its seventh object the provision of a dimension measuring instrument having an indication scale pattern suitable for an absolute measurement.

The present invention has as its eighth object the provision of a dimension measuring instrument capable of easily changing the scale interval and the scale spacing in accordance with the application.

The present invention has as its ninth object the provision of a dimension measuring instrument in which the reading with high accuracy can be facilitated.

To achieve the first object, the present invention contemplates that, in a dimension measuring instrument comprising an encoder for converting a displacement of a spindle into an electric signal and an analogue indication device for electrically indicating a measured value, which has been obtained through processing of an output from the encoder, by a pattern including a scale or scales, a pointer and the like, the analogue indication device is provided with a scale indicating circuit for indicating continuously two or more scales different in scale interval from each other and a pointer indicating circuit for driving the pointer in accordance with the measured value and depending on the scale interval for the indication, and a range of dimension indication is expanded without deteriorating the reading accuracy within a predetermined range of dimension indication.

To achieve the second object, the present invention contemplates that the scale indication circuit is connected to a scale setter, and scales different in scale interval from each other are connected to each other, bordering on an indication scale mark corresponding to a limit value set by this scale setter.

To achieve the third object, the present invention contemplates that the scale setter is adapted to set tolerance values and the minimum scale interval.

To achieve the fourth object, the present invention contemplates that the scale interval is successively enlarged from a boundary of a predetermined indication scale mark.

To achieve the fifth object, the present invention contemplates that the scale interval is enlarged by several stages from a boundary of a predetermined indication scale mark.

To achieve the sixth object, the present invention contemplates that the scale indication patterns of several types are previously set, so that the scale indication patterns can be switched to one another by a scale change-over switch.

To achieve the seventh object, the present invention contemplates that the scale interval is made small at a portion close to a target value and enlarged at portions in front and at the back of the target value.

To achieve the eighth object, the present invention contemplates that the scale indicating circuit can change the setting of the scale interval and the scale spacing.

To achieve the ninth object, the present invention contemplates that, in a dimension measuring instrument comprising an encoder for converting a displacement of a spindle into an electric signal, an analogue indication device for electrically indicating a measured value, which has been obtained through processing of an output from the encoder, by a pattern including a scale or scales, a pointer and the like, and a digital indication device for digitally indicating the measured value, the analogue indication device is provided with a scale indicating circuit for continuously indicating two or more scales different in scale interval and a pointer indicating circuit for driving the pointer in accordance with the measured value and depending on the scale interval for the indication, and a range of dimension indication of the analogue indication device is expanded without deteriorating the reading accuracy within a predetermined range of dimension indication.

According to the present invention, the total range of dimension indication can be expanded without deteriorating the reading accuracy within a predetermined range of dimension indication, for which high reading accuracy is required, so that a dimension and the like within a tolerance can be read with high accuracy and a dimension and the like out of the tolerance can be grasped quantitatively.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENT

Detailed description will be given of an embodiment of the dimension measuring instrument according to the present invention with reference to the drawings.

Figure 1:
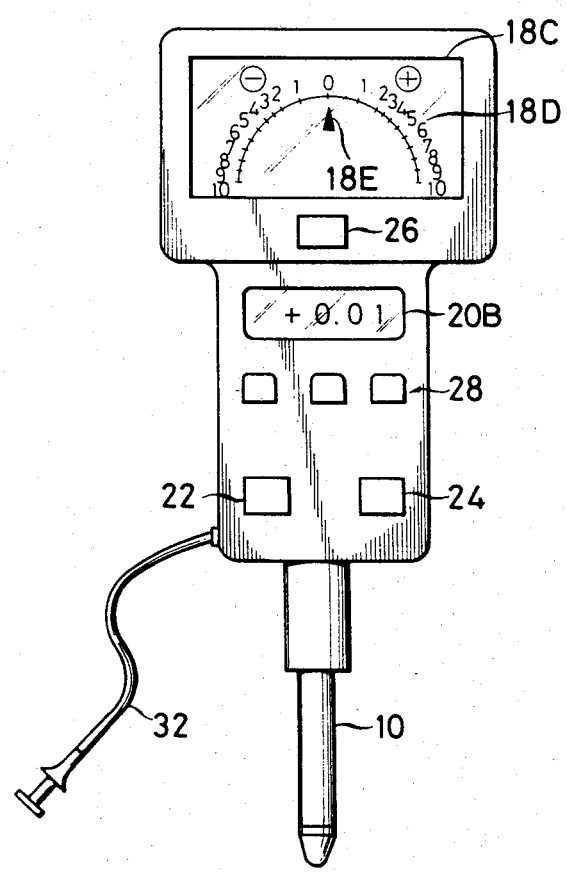
FIG. 1 is a front view showing an embodiment of the dimension measuring instrument according to the present invention.
Figure 2:
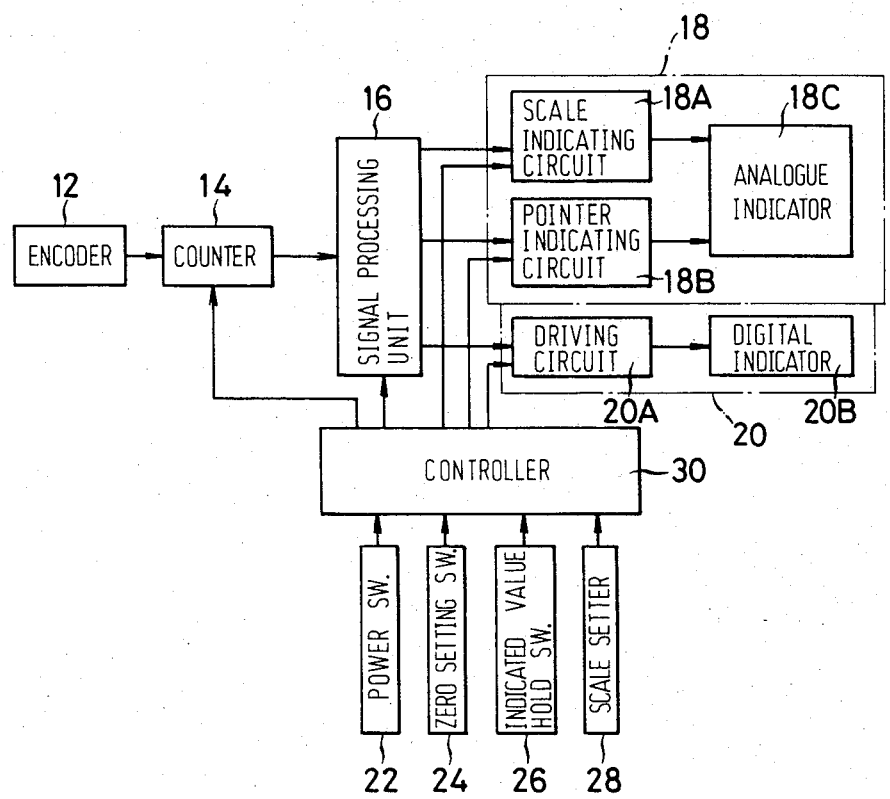
FIG. 2 is a block diagram showing the circuit arrangement of the above embodiment.

As shown in FIGS. 1 and 2, this embodiment comprises:

an encoder 12 including a linear encoder or a rotary encoder for converting a displacement of a spindle 10 into an electric signal;

a counter 14 for counting outputs from the encoder 12;

a signal processing unit 16 for applying a necessary processing to the outputs from the counter 14 in accordance with the conditions of various switches and the setting of setters;

an analogue indication device 18 including a scale indicating circuit 18A for indicating continuously two or more scales different in scale interval, a pointer indicating circuit 18B for driving a pointer 18E in accordance with a measured value fed from the signal processing unit 16 and depending on the scale interval for the indication, and an analogue indicator 18C such as for example liquid crystal for electrically indicating the measured value by a pattern including scales 18D and the pointer 18E in response to outputs from the scale indicating circuit 18A and the pointer indicating circuit 18B;

a digital indication device 20 including a driving circuit 20A for converting an output from the signal processing unit 16 into a signal suitable for the digital indication and a digital indicator 20B for making a digital indication in response to an output from the driving circuit 20A; and a controller 30 for controlling the counter 14, the signal processing unit 16, the scale indicating circuit 18A, the pointer indicating circuit 18B, the driving circuit 20A and the like in response to various setting data fed from a power switch 22, a zero setting switch 24, an indicated value hold switch 26, a scale setter 28 and the like.

In the drawing, designated at 32 is a release for moving the spindle 10 in the vertical direction during measuring.

As the encoder 12, any one of encoders of types including an optical type, magnetic type, electric capacity type and the like will do, and, as necessary, one including a dividing circuit, a waveform shaping circuit, a direction discriminating circuit and the like may be adapted.

The reason why the counter 14 is connected to the controller 30 is that such a system is stated to be adapted that zero clear is effected in the counter 14.

Figure 3:
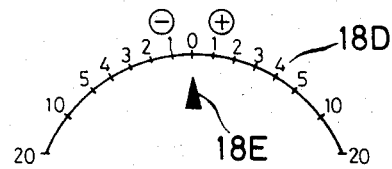
FIG. 3 is a front view showing the analogue indicator in a modification of the dimension measuring instrument according to the present invention.

As the scale setter 28, one, in which the tolerance values (upper and lower limit values) and the minimum scale interval are set, is usable for example in the case of judging by the tolerance. With this arrangement, within the range of zero plus or minus the tolerance values, the minimum set scale interval can be used and, out of the range of zero plus or minus the tolerance values, the scale interval is enlarged, so that the range of dimension indication can be expanded. In this case, the scale interval may be successively enlarged as shown in FIG. 1, or enlarged by several stages as shown in the modification in FIG. 3. Furthermore, scale indication patterns of several types may be previously set, so that the scale indication patterns can be switched to one another by a scale change-over switch. In the case of the absolute measurement, the scale interval at a portion close to a target value may be made small and, at portions in front and at the back of the target value, the scale interval may be enlarged. In any case, the combination of the scale interval with the scale spacing may be desirably selected. Additionally, sub-scale marks may be inserted in the minimum scale of the scale interval, so that the reading can be facilitated.

In this embodiment, not only the analogue indication device 18 but also the digital indication device 20 are provided, so that the reading with high accuracy can be facilitated. Needless to say, the digital indication device 20 may be dispensed with.

Additionally, in the above embodiment, the scale in the range of measuring of the analogue indication device 18 has been formed into a semicircular shape, however, the shape of the scale in the range of measuring need not necessarily be limited to this, but, may be a circular, rectilinear or any other shape.

Futhermore, in the above embodiment, the pointer indicating circuit 18B of the analogue indication device 18 is controlled by the controller 30, however, the circuit 18B may be directly controlled by the scale indicating circuit 18A.

In the above embodiment, the present invention has been applied to the limit gauge, however, the application of the present invention need not necessarily be limited to this, but, may be also applied to other dimension measuring instruments such as slide calipers and a micrometer.

What is claimed is:

1. A dimension measuring instrument comprising:
   an encoder for converting a displacement of a spindle into an electric signal;
   an analogue indication device for electrically indicating a measured value obtained through processing of an output from said encoder, said analogue indication device electrically indicating the measured value by a pattern including at least one scale and a pointer;
   a scale indicating circuit included in said analogue indication device, said scale indicating circuit indicating at least one scale having different scale intervals in one scale row; and
   a pointer indicating circuit included in said analogue indication device, said pointer indicating circuit driving said pointer in accordance with said measured value and depending on the scale intervals for the indication;
   whereby a range of dimension indication is expanded without deteriorating the reading accuracy within a predetermined range of dimension indication.

2. A dimension measuring instrument as set forth in claim 1, wherein said scale indicating circuit is connected to a scale setter, and scales different in scale interval from each other are connected to each other, bordering on an indication scale mark corresponding to a limit value set by said scale setter.

3. A dimension measuring instrument as set forth in claim 2, wherein said scale setter is adapted to set tolerance values and the minimum scale interval.

4. A dimension measuring instrument as set forth in claim 1, wherein said scale intervals are successively enlarged from a boundary of a predetermined indication scale mark.

5. A dimension measuring instrument as set forth in claim 1, wherein said scale intervals are enlarged by several stages from a boundary of a predetermined indication scale mark.

6. A dimension measuring instrument as set forth in claim 1, wherein the scale indication patterns of several types are previously set, so that said scale indication patterns can be switched to one another by a scale change-over switch.

7. A dimension measuring instrument as set forth in claim 1, wherein said scale intervals are made small at a portion close to a target value and enlarged at portions in front and at the back of said target value.

8. A dimension measuring instrument as set forth in claim 1, wherein said scale indicating circuit can change the setting of the scale intervals and the scale spacings.

9. A dimension measuring instrument comprising:
an encoder for converting a displacement of a spindle into an electric signal;
an analogue indication device for electrically indicating a measured value obtained through processing of an output from said encoder, said analogue indication device electrically indicating the measured value by a pattern including at least one scale and a pointer;
a digital indication device for digitally indicating said measured value;
a scale indicating circuit included in said analogue indication device, said scale indicating circuit indicating at least one scale having different scale intervals in one scale row; and
a pointer indicating circuit included in said analogue indication device, said pointer indicating circuit driving said pointer in accordance with said measured value and depending on the scale intervals for the indication;
whereby a range of dimension indication of said analogue indication device is expanded without deteriorating the reading accuracy within a predetermined range of dimension indication.

* * * * *